United States Patent [19]

Kar et al.

[11] 4,429,854
[45] Feb. 7, 1984

[54] DUAL SQUEEZE SEAL GLAND

[75] Inventors: Nareshchandra J. Kar, Westminster; Rao R. Nimmagadda, Fountain Valley, both of Calif.

[73] Assignee: Smith International, Inc., Newport Beach, Calif.

[21] Appl. No.: 444,549

[22] Filed: Nov. 26, 1982

[51] Int. Cl.³ .......................................... E21B 10/08
[52] U.S. Cl. ..................................... 384/94; 175/371; 277/26; 277/177
[58] Field of Search ................... 277/1, 9, 9.5, 84, 96, 277/173, 177, 188 R, 188 A, 236; 175/371, 372; 384/92, 94, 130, 149, 148, 151, 152; 308/187.1, 187.2; 277/26

[56] References Cited

U.S. PATENT DOCUMENTS

| | | | |
|---|---|---|---|
| 3,007,721 | 11/1961 | Schmohl et al. | 277/236 X |
| 3,923,351 | 12/1975 | Frost | 308/187.2 X |
| 4,102,419 | 7/1978 | Klima | 384/94 X |
| 4,178,045 | 12/1979 | Neilson | 384/94 |
| 4,209,890 | 7/1980 | Koskie, Jr. | 175/371 X |
| 4,281,841 | 8/1981 | Kim et al. | 277/236 |

Primary Examiner—Stuart S. Levy
Assistant Examiner—David Werner
Attorney, Agent, or Firm—Robert G. Upton

[57] ABSTRACT

A resilient O-ring shaft seal for use in a rotary rock bit is described wherein the degree of squeeze imposed upon the O-ring seal is increased in one or more discrete steps, occurring as drilling conditions or bearing deterioration cause rising temperatures to be imposed on the seal. The squeeze is increased in discrete steps through a thermally related shape change in one or more nitinol, or the like, back up rings positioned adjacent to the packing ring seal housed within a seal gland. The seal gland is formed between a rock bit journal and a rock cutter cone rotatably mounted to the journal.

4 Claims, 5 Drawing Figures

DUAL SQUEEZE SEAL GLAND

BACKGROUND OF THE INVENTION

1. Field of the Invention

This invention pertains to the art of rotary rock drilling and, more spcifically, to dynamic grease seals employed to protect bearings supporting rotating conical rock cutters of sealed bearing rotary cone rock bits.

As a well is drilled progressively deeper into the rock mantle of the earth, it becomes progressively more difficult and time consuming to withdraw the drill string, replace a faulty rock bit and return the new bit to the borehole.

One type of drill bit failure requiring such a replacement occurs when wear in a bearing grows to a point where eccentric excursions of the rotary cutter upon its supporting journal exceed the capacity of the resilient seal to compensate for the eccentricity. At this point, drilling fluid, laden with destructive abrasives, passes the protective seal and destroys the bearings.

The capacity of the seal to compensate for eccentricity might have been greater had the O-ring been initially more tightly packed or "squeezed" in its housing gland. However, it has been observed with higher squeeze pressures imposed upon the O-ring, seal life is shortened and caused to fail through bunching, snaking or twisting.

It is well known that friction bearings generally operate most of their useful life with little measurable wear. Eventually, however, wear mechanisms give rise to asperities on the bearing surface. Small asperities wear smooth again only to reappear nearly through the transfer of small amounts of metal from surface to surface as rotation progresses. The asperities grow in area and the rate of growth increases with operating time, until ultimately the bearing fails. It is noted that this process produces heat, at a rate increasing as the area and degree of bearing damage increases. A degenerating bearing thus undergoes a temperature rise as cooling forces are both constant and limited.

2. Description of the Prior Art

U.S. Pat. No. 3,397,928 teaches the use of a radially loaded O-ring to seal the bearing space of a rotating cone rock bit. Novelty is claimed in the use of a percentage rate of squeeze in excess of the published limits recommended by O-ring manufacturers as permitting useful life expectancy in service. The patent teaches a minimum of 10.0 percent with an ideal squeeze of 15.0 percent on the O-ring or seal packing at rock bit assembly. As noted heretofore, excessive O-ring squeeze results in shortened life through bunching, snaking and twisting.

SUMMARY OF THE INVENTION

An object of this invention is to permit use of a conservative percentage of squeeze during a first portion of rock bit service life, when the bearing is sound, to significantly reduce seal wear during the initial operation of the bit.

Another object of this invention is to provide apparatus actuated by the heat generated by a degenerating rock bit bearing. The heat functions to abruptly increase, by a predetermined amount, the effective squeeze on an O-ring seal in a rock bit during a second portion of rock bit service life.

A further object of this invention is to provide for a useful extension of service life of the rock bit as it continues to function effectively in a borehole.

Still another object of this invention is to thermally monitor bearing condition and to provide increased O-ring squeeze at a critical point of the bearing condition just prior to complete bearing failure due to eccentricities between the bearing and its associated cutter cone bearing surface.

The dynamic shaft seal means of the present invention is intended for use in a rock bit having one or more bearing journals cantilevered from a rock bit body. The bearing surface of the journal engagingly opposes a bearing surface formed within a rock cutter element rotatably supporting the cutter.

The lubricated bearing is environmentally protected by the resilient O-ring seal which is positioned in a seal housing gland formed between four cooperating surfaces: one axially extending surface formed on the end of the journal proximal to the bit body, one radially extending surface formed on the bit body circumferentially about the journal, and a similar pair of surfaces forming a shoulder in the mouth of the cone cutter element.

A resilient packing ring and one or more back up rings are positioned in the seal gland.

The novelty of the present invention resides primarily in the back up ring which is composed, for example, of a shape-memory metal alloy. At normal operating temperatures encountered by a new rock bit, the packing ring, which may be an O-ring, is radially compressed within its seal gland by from about 4.0 percent to about 9.0 percent of its cross-sectional area and is essentially unconstrained axially.

When bearing deterioration elevates the operating temperature within the bearing surfaces and activates the shape-memory of the back up ring, the cross-sectional shape of the back up ring changes abruptly from flat to convex, moving toward the packing ring. This action axially pinches the ring, thus increasing the total deformation to from about 10,0 percent to about 20.0 percent.

In those cases where bit failure initiates in the bearing, an advantage of this invention is a potential of some extension in rock bit service life by reinforcing seal capability to accommodate large eccentric excursions of the cutter element.

A further advantage of this invention is that its practice permits the conservation of seal life early in the bit service life through use of a low value of squeeze at rock bit assembly, further permitting utilization of that seal life during the more critical latter portion of bit service life.

The above noted objects and advantages of the present invention will be more fully understood upon a study of the following description in conjuction with the detailed drawings.

DESCRIPTION OF THE PREFERRED EMBODIMENTS AND BEST MODE FOR CARRYING OUT THE INVENTION

Figure 1:
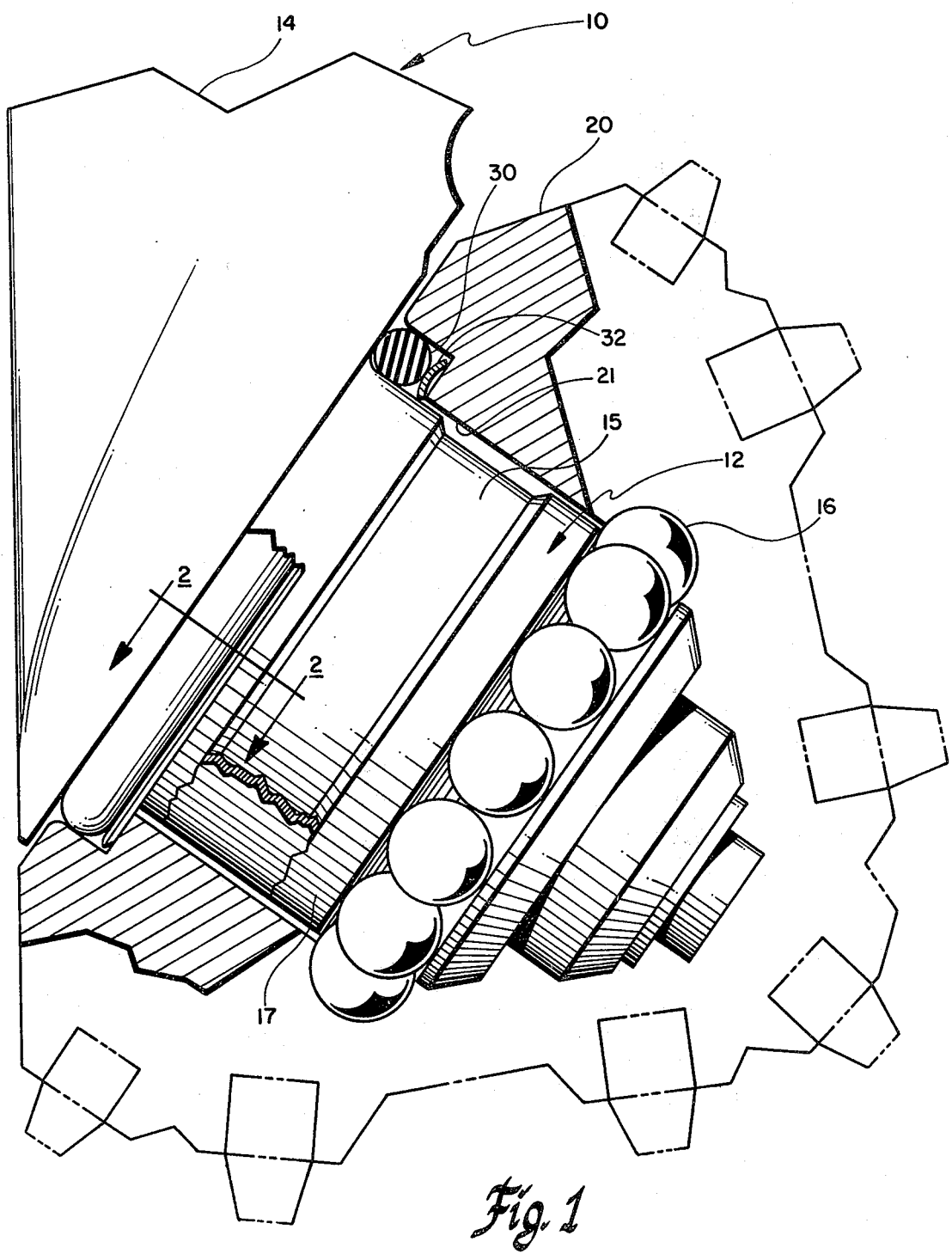
FIG. 1 is a partial section of a cutter element of a sealed bearing rock bit showing the journal, seal and part of the bit body.

In FIG. 1, a portion of the cutting end of a rock bit, generally designated as 10, is comprised of a leg portion 14 supporting a cantilevered bearing journal 12. A rock cutter cone 20, shown in partial section, is retained on the journal 12 by bearing balls 16. Lubricant is retained within the cone 20 between cone bearing surface 21 and journal bearing surface 17 by a seal 30, aided by a back up ring 32, which also exlcudes fluids within the borehole from entering between the journal 12 and the cone 20. A reservoir of lubricant is provided in channel 15 of journal 12.

Figure 2:
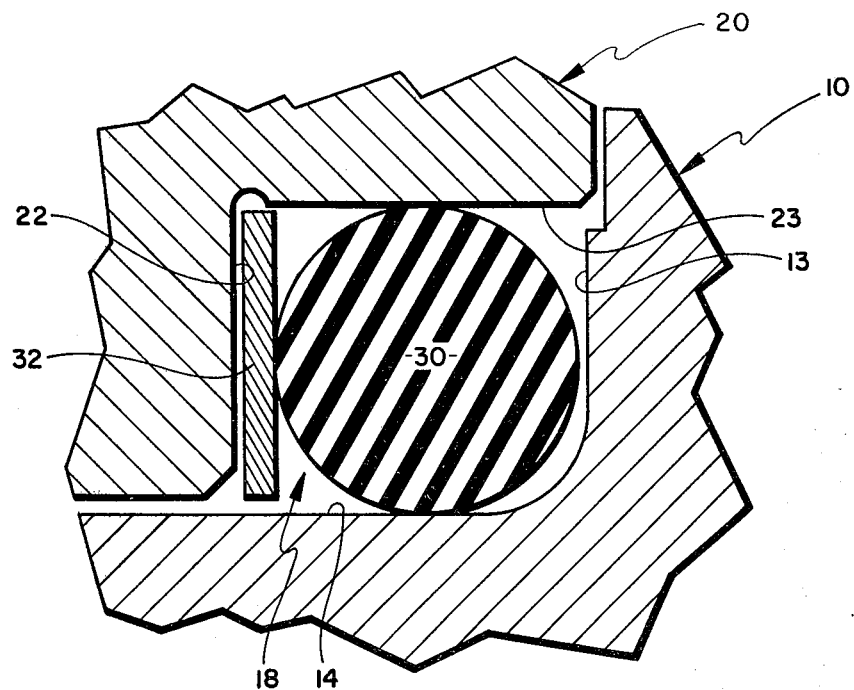
FIG. 2 is an enlarged section taken through 2-2 of FIG. 1, illustrating the seal at a temperature below the back up ring memory-activating temperature.

Turning now to FIG. 2, the annular seal gland groove, or channel, generally designated as 18, is defined by the two axially extending sealing surfaces: the journal sealing surface 14 and the cone sealing surface 23; and two radially extending surfaces: the cone radial wall 22 and the journal radial wall 13.

Positioned within the seal gland groove 18 is a resilient seal 30 and a back up ring 32. Resilient seal 30 is an elastomeric O-ring of, for example, a nitrile material of durometer hardness of about Shore A80. The back up ring is preferably composed of a nickel-titanium shape-memory alloy, known generically as nitinol, compounded to display a shape change at a predetermined temperature. Nitinol is now available from several suppliers, such as Raychem Corporation, 1010 Lamar, Houston, Tex. 77002. Raychem alloys bear the trade name of "Tinel". The ring 32 is given a cross-sectional form which is convex toward one major surface without harboring residual stresses in the metal. The ring 32 is then forceably flattened, while cold and in a fully martensitic phase, and positioned in the seal gland groove 18 with the side previously convex being adjacent the O-ring 30.

Figure 3:
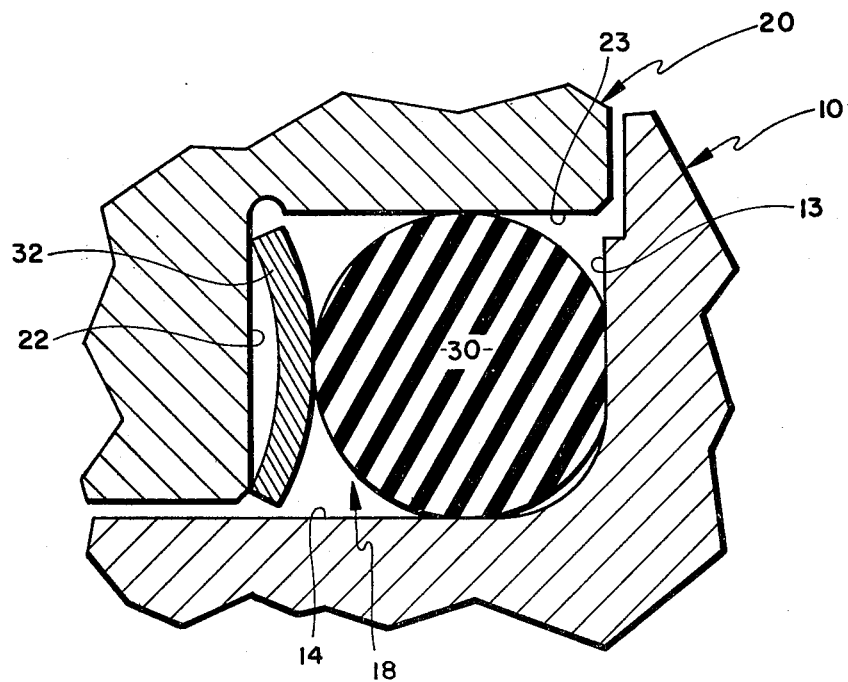
FIG. 3 is similar to FIG. 2, illustrating the seal condition at an elevated temperature.

FIG. 3 shows the same section as does FIG. 2 after the temperature has exceeded the predetermined shape-change temperature. The O-ring 30, which was assembled compressed between about 4.0 percent to about 9.0 percent, becomes compressed from about 10.0 percent to about 20.0 percent by the shape-change action of the back up ring 32 which reverts to its previous convex form when the predetermined temperature is reached. The shape-change temperature may be predetermined to suit expected drilling temperatures and may be, for example, from about 140° F. to about 250° F., but nitinol may be compounded to display the shape-change phenomenon at any approximate 20° F. temperature range up to 250° F.

Figure 4:
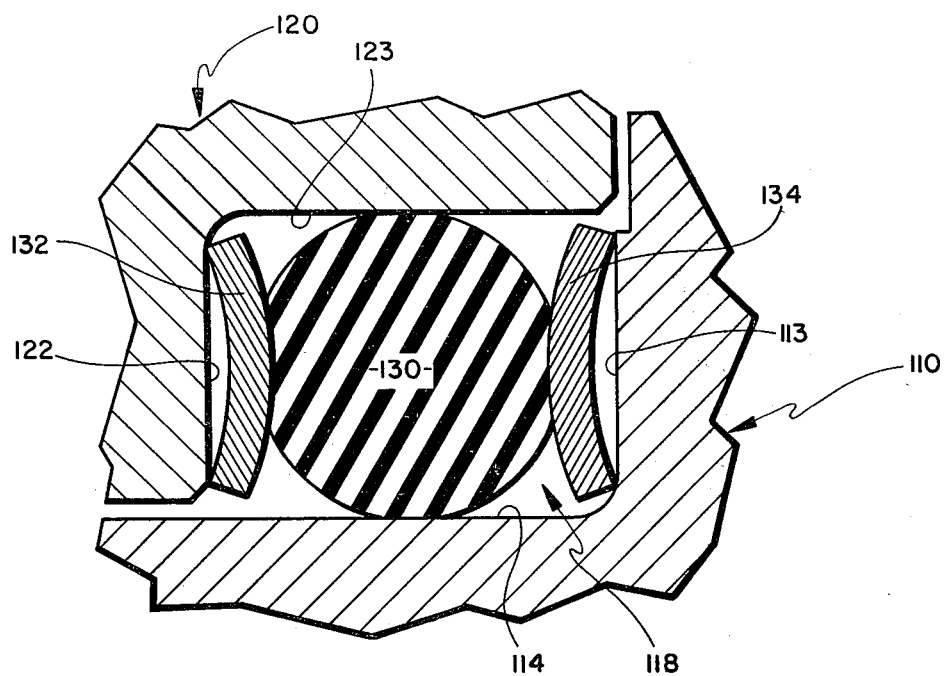
FIG. 4 is similar to FIG. 2, showing an alternate embodiment employing two back up rings at an elevated temperature.

An alternative embodiment employing a second back up ring 134 is depicted in FIG. 4, shown at elevated temperature. An advantage may be found in this embodiment if back up ring 134 reacts at a different temperature than does back up ring 132, thus providing a total of three differing levels of seal compression during the drilling life of the bit.

It would therfore be obvious to employ additional back up rings, operating at differing temperatures, to provide additional steps in the level of seal compression. These smaller increments would gradually accumulate to the same total maximum squeeze as would be provided in one step by the use of a single back up ring.

Each additional back up ring not in contact with the O-ring must be positioned to react in directional opposition to any adjacent back up ring in order to realize the cumulative effect upon the packing ring.

Figure 5:
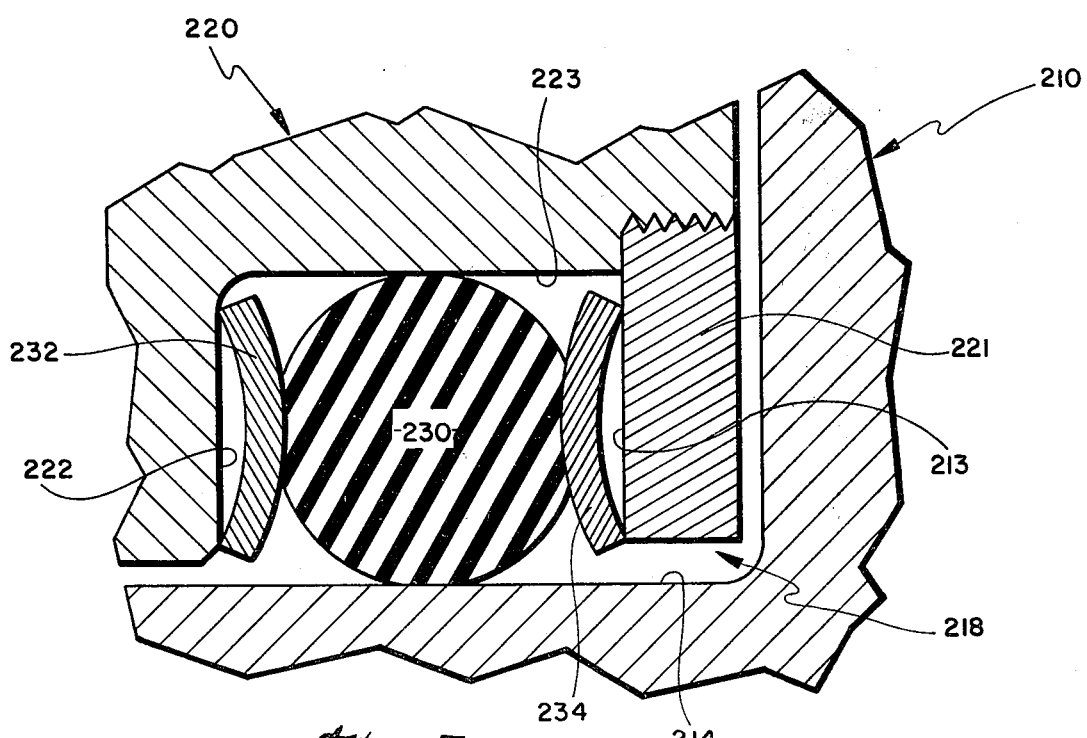
FIG. 5 is yet another embodiment of the present invention wherein the seal gland cavity is U-shaped with a pair of back up rings in the U-shaped channel, or groove, in the cone.

FIG. 5 illustrates yet another embodiment characterized in that both radially extending seal gland walls 213 and 222, and one axially extending seal gland surface 223, are formed within the rock cutter cone 220. Back up ring 232, O-ring 230 and back up ring 234 are assembled into the cutter cone 220 and are held in position by retainer ring 221 which also provides the radial gland wall 213. Although retainer ring 221 is shown threaded in the cutter element, any assembly method may be used. For example, ring 221 may be secured through an interference fit in the cone backface.

This embodiment is advantaged in that the level of squeeze imposed upon the packing ring remains relatively constant during axial displacements of the cutter element 220 along its supporting journal 210.

It would be obvious to use friction-reducing or protective coatings or plating in conjunction with back up rings or to isolate the packing ring from the back up rings by use of a separate washer between the back up rings and the resilient seal packing.

Nitinol is a nickel alloy, being 43.0 to 47.0 percent titanium, and is described in U.S. Pat. No. 3,174,851. It would be obvious to use any other alloy which exhibits a crystallographically reversible, thermoelastic martensitic transformation. Some other known shape-memory metal alloy systems are: Cu-Zn, Cu-Zn-Al, Cu-Zn-Ga, Cu-Zn-Sn, Cu-Zn-Si, Ci-Al-Ni, Cu-Au-Zn, Cu-Sn, Fe-Pt, Ni-Al, and Au-Cd.

Any suitable elastomeric packing ring may be used in the practice of this invention. The preferred embodiments use an O-ring made, for example, of a nitrile material with a durometer hardness of about Shore A80.

It additionally would be obvious to incorporate the teachings of this invention in other than a rock bit. For example, a shaft with any rotational part mounted to the shaft, with a seal requirement, could take advantage of the teachings of this invention.

It is anticipated that back up rings could be produced according to this invention which at assembly have a substantially cylindrical form. Such rings would become radially convex when exposed to temperatures in their predetermined transformation range and thereby serve to radially compress the packing ring.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

We claim:

1. Dynamic shaft seal means for rock bit bearings comprising:
    at least one cantilevered bearing journal formed on a rock bit body,
    a rock cutter element mounted to each said bearing journal and having a bearing surface formed therein that engagingly opposes said bearing journal, a shoulder formed circumferentially about said bearing surface in said rock cutter element, said shoulder having substantially one radially extending surface and one axially extending surface, an axially extending surface formed on an end of said journal proximal to said rock bit body and a radially extending surface formed on said rock bit body circumferentially about said journal, two said surfaces cooperating with said shoulder upon assembly of said rock cutter element to said journal to form a seal housing gland therebetween, a resilient packing O-ring positioned within said seal housing gland, said O-ring having a durometer hardness of about Shore A80, and at least one back up ring positioned within said seal housing gland, said at least one back up ring being composed of a shape-memory metal alloy and having a radially planar shape, said shape-memory metal alloy is selected from the nickel-titanium alloy family known generically as nitinol, said shape-memory metal alloy becoming convex in cross section to axially compress said packing O-ring after exposure to a predetermined transformation temperature, said packing O-ring is substantially unconstrained axially, said packing O-ring is radially compressed by from about 4.0 percent to about 9.0 percent at assembly and is axially compressed by said back up ring when said back up ring is of convex cross section to a resultant total of about 10.0 percent to about 20.0 percent deformation.

2. The invention as set forth in claim 1 wherein said at least one back up ring is composed of a shape-memory metal alloy being compounded to display a shape-memory change at a temperature in the range of between from about 150° F. to about 250° F.

3. The invention as set forth in claim 1 wherein said at least one back up ring is composed of a shape-metal alloy being compounded to display a shape-memory change at a temperature higher than about 140° F.

4. The invention as set forth in claim 1 wherein a plurality of said back up rings are composed of shape-memory metal alloys variously compounded to display shape-memory changes at temperatures higher than about 140° F.

* * * * *